US010746122B2

(12) United States Patent
Burkhardt et al.

(10) Patent No.: US 10,746,122 B2
(45) Date of Patent: Aug. 18, 2020

(54) OPERATION OF AN INTERNAL COMBUSTION ENGINE HAVING A WASTEGATE TURBOCHARGER

(71) Applicant: Continental Automotive GmbH, Hannover (DE)

(72) Inventors: Thomas Burkhardt, Neutraubling (DE); Jürgen Dingl, Regensburg (DE)

(73) Assignee: CONTINENTAL AUTOMOTIVE GMBH, Hannover (DE)

( * ) Notice: Subject to any disclaimer, the term of this patent is extended or adjusted under 35 U.S.C. 154(b) by 4 days.

(21) Appl. No.: 16/092,682

(22) PCT Filed: Feb. 9, 2017

(86) PCT No.: PCT/EP2017/052923
§ 371 (c)(1),
(2) Date: Oct. 10, 2018

(87) PCT Pub. No.: WO2017/178130
PCT Pub. Date: Oct. 19, 2017

(65) Prior Publication Data
US 2019/0128206 A1    May 2, 2019

(30) Foreign Application Priority Data
Apr. 14, 2016  (DE) .......................... 10 2016 206 329

(51) Int. Cl.
*F02D 41/22*      (2006.01)
*F02D 41/10*      (2006.01)
(Continued)

(52) U.S. Cl.
CPC ............ *F02D 41/222* (2013.01); *F02B 37/18* (2013.01); *F02D 41/0007* (2013.01);
(Continued)

(58) Field of Classification Search
CPC .............. F02D 41/222; F02D 41/0007; F02D 2200/50; F02D 2400/11; F02D 2200/0406;
(Continued)

(56) References Cited

U.S. PATENT DOCUMENTS

2005/0234634 A1   10/2005   Beyer et al. .................. 701/114
2006/0282200 A1   12/2006   Thiel et al. ................... 701/30.2
(Continued)

FOREIGN PATENT DOCUMENTS

DE    198 48 166 A1    4/2000    ............ F02D 41/10
DE    102 30 834 A1    1/2004    ............ F02D 41/22
(Continued)

OTHER PUBLICATIONS

German Office Action, Application No. 10 2016 206 329.4, 6 pages, dated Oct. 12, 2016.
(Continued)

*Primary Examiner* — Thai Ba Trieu
(74) *Attorney, Agent, or Firm* — Slayden Grubert Beard PLLC

(57) ABSTRACT

Various embodiments may include a method for operating an internal combustion engine having a wastegate turbocharger comprising: measuring an intake pipe pressure; determining a cylinder air mass from the pressure; injecting an amount of fuel into a cylinder of the internal combustion engine based on the air mass; determining and a plausible intake pipe pressure gradient for a current engine operating point; calculating a gradient of the measured intake pipe pressure during a full-load acceleration; comparing the stored plausible intake pipe pressure gradient to the calculated gradient; identifying manipulation of the intake pipe pressure sensor if the difference between the stored plausible intake pipe pressure gradient and the calculated gradient
(Continued)

exceeds a selected threshold value; and limiting a power output of the engine if manipulation is identified.

5 Claims, 2 Drawing Sheets

(51) Int. Cl.
*F02D 41/00* (2006.01)
*F02B 37/18* (2006.01)

(52) U.S. Cl.
CPC ...... *F02D 41/10* (2013.01); *F02D 2200/0406* (2013.01); *F02D 2200/0408* (2013.01); *F02D 2200/101* (2013.01); *F02D 2200/50* (2013.01); *F02D 2400/11* (2013.01); *Y02T 10/40* (2013.01)

(58) Field of Classification Search
CPC ....... F02D 2200/0408; F02D 2200/101; F02B 37/18; F02B 37/16; Y02T 10/40
USPC .......................... 60/605.1, 602; 701/103–104
See application file for complete search history.

(56) References Cited

U.S. PATENT DOCUMENTS

| | | | | |
|---|---|---|---|---|
| 2006/0288702 | A1* | 12/2006 | Gokhale | F02B 37/18 60/602 |
| 2008/0168771 | A1* | 7/2008 | Roettger | F02D 41/0007 60/602 |
| 2010/0059026 | A1* | 3/2010 | Schmalzl | F02B 37/18 60/602 |
| 2013/0232971 | A1* | 9/2013 | Miazgowicz | F02B 37/16 60/602 |
| 2018/0128196 | A1* | 5/2018 | Gottlieb | F02D 41/0007 |
| 2018/0252140 | A1* | 9/2018 | Mandausch | F02B 37/183 |

FOREIGN PATENT DOCUMENTS

| | | | | |
|---|---|---|---|---|
| DE | 10 2005 027 565 A1 | 12/2006 | ............ | F02D 41/00 |
| DE | 10 2008 005 958 A1 | 8/2009 | ............ | F02D 41/22 |
| DE | 10 2011 101 825 | 11/2012 | ............ | F02D 41/22 |
| DE | 10 2011 104 016 A1 | 12/2012 | ............ | F02B 37/12 |
| DE | 10 2011 108 697 A1 | 1/2013 | ............ | F02D 41/10 |
| DE | 10 2012 001 356 A1 | 7/2013 | ............ | F02D 41/00 |
| FR | 2 890 116 A1 | 3/2007 | ............ | F02D 41/22 |
| WO | 2017/178130 A1 | 10/2017 | ............ | F02D 41/10 |

OTHER PUBLICATIONS

International Search Report and Written Opinion, Application No. PCT/EP2017/052923, 21 pages, dated Apr. 28, 2017.

* cited by examiner

OPERATION OF AN INTERNAL COMBUSTION ENGINE HAVING A WASTEGATE TURBOCHARGER

CROSS-REFERENCE TO RELATED APPLICATIONS

This application is a U.S. National Stage Application of International Application No. PCT/EP2017/052923 filed Feb. 9, 2017, which designates the United States of America, and claims priority to DE Application No. 10 2016 206 329.4 filed Apr. 14, 2016, the contents of which are hereby incorporated by reference in their entirety.

TECHNICAL FIELD

The present disclosure relates to internal combustion engines. Various embodiments may include a method for operating an internal combustion engine having a wastegate turbocharger, in which an intake pipe pressure sensor measures the intake pipe pressure and, from this, an engine control device determines the cylinder air mass, and in which fuel is injected on the basis of the cylinder air mass determined.

BACKGROUND

"Intake pipe pressure sensor" refers to a sensor which measures the pressure prevailing in the intake pipe. It does not necessarily have to be arranged directly in the intake pipe. In particular, it can also be a sensor usually referred to as a boost pressure sensor, which is arranged between the turbocharger compressor and the throttle valve ahead of the intake pipe, where the same pressure as in the intake pipe prevails when the throttle valve is open.

Modern internal combustion engines are often fitted with turbochargers to provide a higher engine power in comparison with naturally aspirated engines of the same swept volume. It is very common for vehicle manufacturers to offer engines of identical construction in different power versions. The individual engine components are in each case dimensioned for the most powerful version planned but can also be used in less powerful versions.

Owing to these available technical reserves of individual engine components, a number of commercial providers—tuners—have appeared, promising and—at least in some cases—achieving increases in power and/or fuel savings from the engines by modifications to the engine hardware and software. At the same time, however, there can be a negative impact on fuel emissions and/or on the life of the engine. From the point of view of manufacturers and legislators, therefore, these modifications are undesirable. It has also been observed that engines which have probably been damaged by tuning measures have been brought to repair garages after the reversal of the tuning measures with the expectation that they will be repaired at the expense of the manufacturer. For these reasons, there is a search for methods of reliably detecting such tuning measures in the engine controller.

For pressure-led turbocharged engines without an air mass meter, the cylinder air mass is calculated in the engine control device on the basis of the measured intake pipe pressure. On the basis of the calculated cylinder air mass, fuel is injected, and the engine produces torque. In factory condition, the engine controller correctly records the intake pipe pressure based on the measured value of the intake pipe pressure sensor, calculates the actual cylinder air mass and meters in sufficient fuel to ensure that the engine is operated at the desired fuel-air ratio. Minor deviations of the measured fuel-air ratio from its setpoint are compensated by the lambda controller implemented in the engine controller through correction of the fuel injection quantity.

If, starting from an engine operating point described in the engine controller, the actual intake pipe pressure is increased while the measured value of the intake pipe pressure remains unchanged—however this is achieved—this also leads to a real increase in the actual cylinder air mass, even if the cylinder air mass calculated in the engine control device does not rise. With a constant fuel quantity in the initial stage, this leads to dilution of the exhaust gas, i.e. to excess oxygen in the exhaust gas. The lambda probe measures this excess oxygen, and the engine control device increases the injected fuel mass in order to actually maintain the air-fuel ratio demanded. The engine thus actually has more air and more fuel available than demanded by the engine control device and actually produces more torque than demanded by the engine control device without the engine controller recording this. An increase of this kind in the actual intake pipe pressure is therefore one possible way of increasing the engine power.

A real increase of this kind in the intake pipe pressure relative to the measured value of the intake pipe pressure can be achieved, for example, if the measured intake pipe pressure is manipulated toward lower values by installing a tuning device between the intake pipe pressure sensor and the engine control device to manipulate the sensor signals accordingly.

SUMMARY

The teachings of the present disclosure may be embodied in a method of the type by means of which manipulations of the intake pipe pressure sensor can be detected. For example, a method may include: determination and storage of a plausible intake pipe pressure gradient for a respectively current engine operating point in the engine control device; calculation of the gradient of the current intake pipe pressure measured with the intake pipe pressure sensor during a full-load acceleration by the engine control device; comparison of the two values with one another; and detection of manipulation of the intake pipe pressure sensor if the difference between the stored plausible intake pipe pressure gradient and the currently calculated intake pipe pressure gradient exceeds a selected threshold value.

An example method for operating an internal combustion engine having a wastegate turbocharger, in which an intake pipe pressure sensor measures the intake pipe pressure and, from this, an engine control device determines the cylinder air mass, and in which fuel is injected on the basis of the cylinder air mass determined, may include:

(1) determination and storage of a plausible intake pipe pressure gradient for a respectively current engine operating point in the engine control device;

(2) calculation of the gradient of the current intake pipe pressure measured with the intake pipe pressure sensor during a full-load acceleration by the engine control device;

(3) comparison of the two values with one another; and (4) detection of manipulation of the intake pipe pressure sensor if the difference between the stored plausible intake pipe pressure gradient and the currently calculated intake pipe pressure gradient exceeds a selected threshold value.

In some embodiments, the detected manipulation is stored in the error memory of the engine control device (5).

In some embodiments, the power of the engine is limited as an error response (6).

In some embodiments, the gradient of the current intake pipe pressure is calculated during each full-load acceleration.

In some embodiments, the plausible intake pipe pressure gradient is determined on an un-manipulated reference engine. In some embodiments, the engine operating point is characterized by the engine speed and/or gear ratio, in particular also by the intake pipe pressure at the beginning of the full-load acceleration and/or by the gradient of the engine speed.

Another example embodiment may include an internal combustion engine having a wastegate turbocharger and an engine control device, characterized in that it is designed for carrying out the method as described above.

BRIEF DESCRIPTION OF THE DRAWINGS

The teachings herein are explained in detail below with reference to an exemplary embodiment in connection with the drawing. In The drawings.

DETAILED DESCRIPTION

Figure 1:
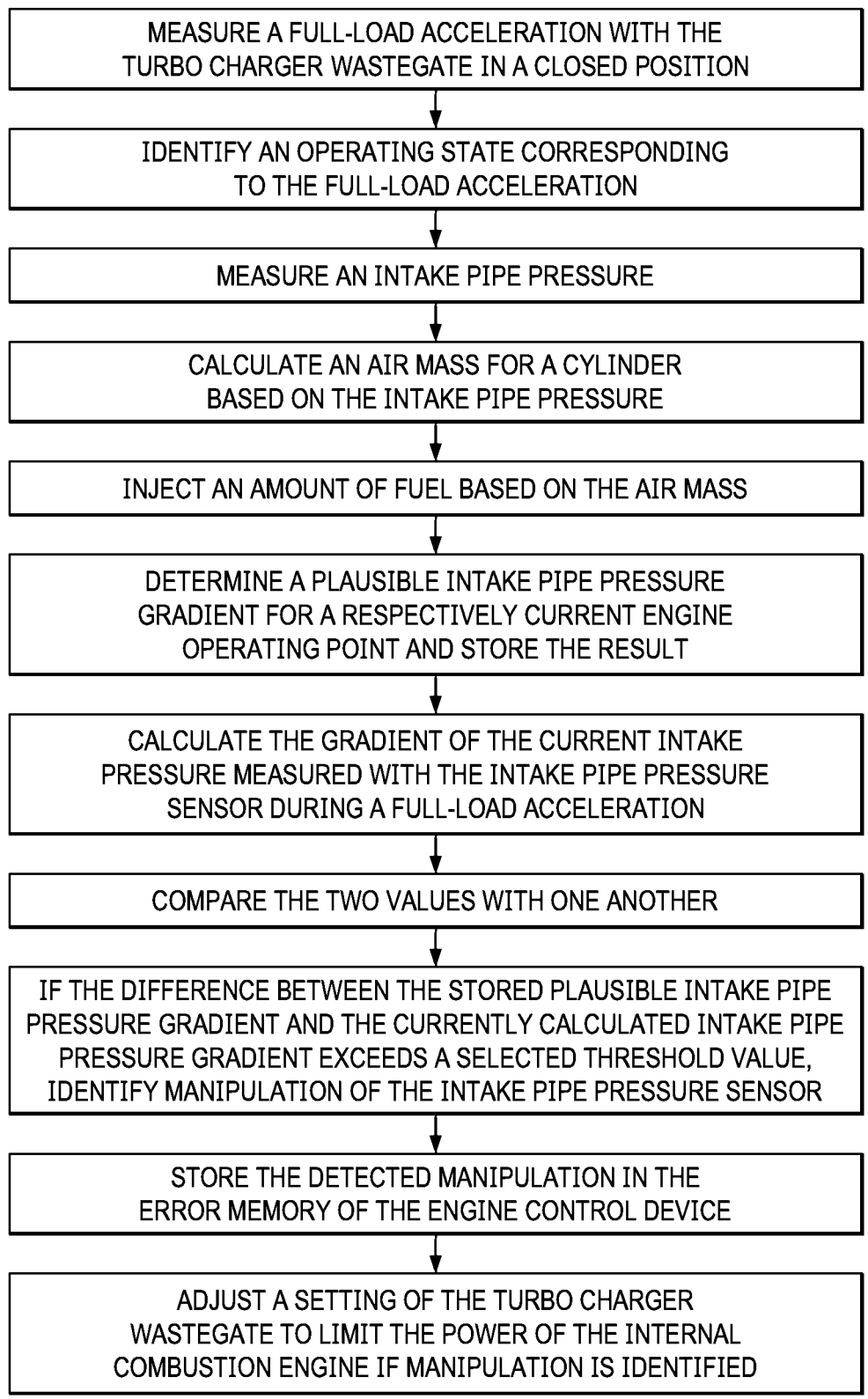
FIG. 1 shows a flow diagram of a method for controlling an internal combustion engine incorporating the teachings of the present disclosure.
Figure 2:
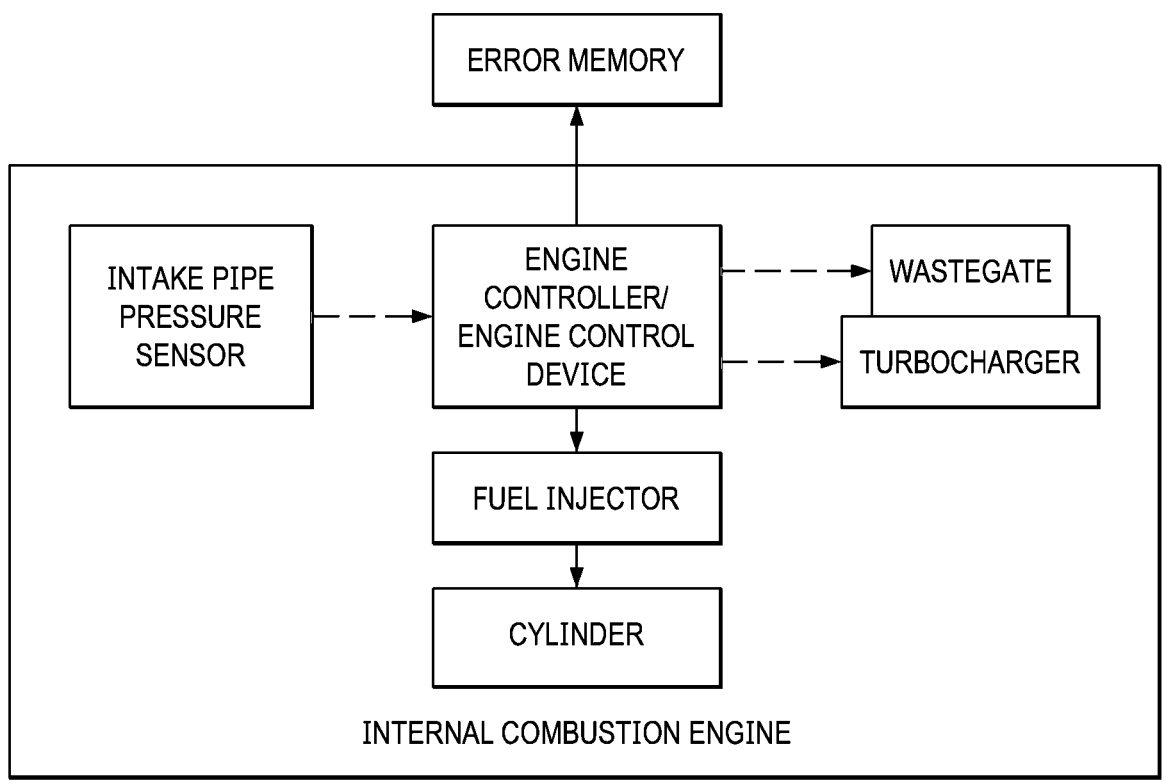
FIG. 2 is a schematic drawing depicting an internal combustion engine incorporating teachings of the present disclosure.

To enable a manipulation of the measured value of the intake pipe pressure at a specific engine operating point to bring about an increase in the actual power of the internal combustion engine in the manner described above, the engine should be capable at this operating point of actually increasing the air mass flow into the engine beyond the air mass flow demanded by the engine controller for this engine operating point by adjusting the actuators of the air path. For internal combustion engines having a wastegate turbocharger, the relevant actuators in the air path for controlling the air mass flow include the throttle valve for controlled throttling and the wastegate for controlling the turbocharger power. At engine operating points in the boost mode close to full load, the throttle valve is generally fully open and does not offer any possibility of further increasing the air mass flow. Therefore, it is only possible to achieve an increase in the air mass flow at engine operating points close to full load by increasing the turbocharger power by means of further closure of the wastegate.

Conversely, this means that, at engine operating points with an open throttle valve and a closed wastegate, it is not possible to actually increase the air mass flow and hence the engine power by manipulating the measured values. There are no known tuning devices which are capable of evaluating the wastegate actuating signals transmitted by the engine control device and/or of evaluating the position feedback of the wastegate to the engine control device. Therefore, any manipulation of the measured value of the intake pipe pressure acts both at engine operating points with a partially open waste gate and at engine operating points with a fully closed wastegate. This gives rise to the possibility, at operating points with a closed wastegate, of comparing the engine state variables modeled in the engine controller on the basis of the currently measured intake pipe pressure with values for this state variable which are stored in the engine control device and are plausible for this operating point.

In a steady state with constant state variables, especially with a constant engine speed, engines in actual road conditions are very seldom operated with a closed wastegate. This occurs only at a low engine speed when hill climbing. At all other operating points, the engine power is sufficient to accelerate the engine. These operating points are therefore not steady. However, operating points with a closed wastegate often occur for a few seconds during full-load acceleration phases. During a full-load acceleration, the air mass flow and hence the pressure ahead of the throttle valve, the intake pipe pressure, the engine power and the engine speed increase with the maximum possible gradient for the respective engine operating point for several seconds owing to the full opening of the throttle valve and the full closure of the wastegate. This operating-point-specific maximum gradient of the intake pipe pressure is stored in the engine control device.

During a full-load acceleration, the gradient of the intake pipe pressure is calculated in the engine control device on the basis of the measured intake pipe pressure. If the measured value of the intake pipe pressure is being manipulated toward lower values by a tuning device, the gradient calculated from the manipulated measured values is lower than the plausible gradient stored for the current engine operating point in the engine control device. If the difference between the stored plausible intake pipe gradient and the currently calculated intake pipe pressure gradient exceeds a selected threshold value, manipulation of the intake pipe pressure sensor is detected.

In this case, the detected manipulation may be stored in the error memory of the engine control device. As an error response, the power of the engine can be limited, for example.

In some embodiments, the gradient of the current intake pipe pressure may be calculated during each full-load acceleration. In particular, the plausible intake pipe pressure gradient stored in the engine control device may be determined on an un-manipulated reference engine.

In some embodiments, the engine operating point may be characterized by the engine speed and/or gear ratio, in particular also by the intake pipe pressure at the beginning of the full-load acceleration and/or by the gradient of the engine speed.

In some embodiments, an internal combustion engine having a wastegate turbocharger and an engine control device is designed for carrying out the above-described method.

In some embodiments, manipulation of the intake pipe sensor and an increase thereby achieved in the power of an internal combustion engine having a wastegate turbocharger can be detected. The example embodiment described below relates to an internal combustion engine which has a wastegate turbocharger. A wastegate is a flap which guides the exhaust gases in the turbocharger past the turbine wheel. Furthermore, the internal combustion engine has an intake pipe pressure sensor, which measures the intake pipe pressure. From this, an engine control device determines the cylinder air mass. Based on the cylinder air mass determined, a corresponding fuel quantity is injected.

There are known tuning measures for internal combustion engines of this kind in which a real increase in the intake pipe pressure relative to the measured value of the intake pipe pressure is achieved by manipulating the measured intake pipe pressure toward lower values by installing a tuning device between the intake pipe pressure sensor and the engine control device to manipulate the sensor signals accordingly. In the method described, it is now a question of detecting manipulation of the intake pipe pressure sensor.

In a first step, a plausible intake pipe pressure gradient for a respectively current engine operating point is determined and stored in the engine control device. This plausible intake pipe pressure gradient is determined on an un-manipulated reference engine (step 1).

In step 2, the gradient of the current intake pressure measured with the intake pipe pressure sensor during a full-load acceleration is calculated by the engine control device.

In step 3, the two values are compared with one another, and, in step 4, if the difference between the stored plausible intake pipe pressure gradient and the currently calculated intake pipe pressure gradient exceeds a selected threshold value, manipulation of the intake pipe pressure sensor is detected.

The detected manipulation can then be stored in the error memory of the engine control device (step 5), and the power of the internal combustion engine can be limited as an error response as a targeted countermeasure (step 6).

What is claimed is:

1. A method for operating an internal combustion engine having an engine controller, at least one combustion cylinder, and a turbocharger including a turbocharger wastegate, the method comprising:
    measuring a full-load acceleration with the turbocharger wastegate in a closed position using the engine controller;
    identifying an operating state corresponding to the full-load acceleration using the engine controller;
    sending a measurement of a pressure in an intake pipe of the internal combustion engine while the internal combustion engine is in the identified operating state, from a pressure sensor to the engine controller;
    calculating an air mass for the at least one cylinder based at least in part on the measured intake pipe pressure using the engine controller;
    sending a signal from the engine controller to a fuel injector to inject an amount of fuel into the at least one cylinder based on the determined air mass;
    calculating and storing in an error memory of the engine controller a plausible intake pipe pressure gradient for the engine operating state;
    calculating a gradient of the measured intake pipe pressure using the engine controller;
    comparing the stored plausible intake pipe pressure gradient to the calculated gradient using the engine controller;
    identifying manipulation of the intake pipe pressure sensor if the difference between the stored plausible intake pipe pressure gradient and the calculated gradient exceeds a selected threshold value using the engine controller; and
    adjusting a setting of the turbocharger wastegate to limit a power output of the internal combustion engine if manipulation is identified.

2. The method as claimed in claim 1, further comprising storing an identified manipulation in the error memory.

3. The method as claimed in claim 1, further comprising calculating a gradient of the current intake pipe pressure during each full-load acceleration of the internal combustion engine using the engine controller.

4. The method as claimed in claim 1, wherein the plausible intake pipe pressure gradient has been determined on an un-manipulated reference engine.

5. An internal combustion engine comprising:
    a turbocharger including a turbocharger wastegate;
    a combustion cylinder fed by an intake pipe and a fuel injector;
    a pressure sensor measuring an instantaneous pressure in the intake pipe; and
    an engine control device in communication with the pressure sensor and the fuel injector, the engine control device including a processor programmed to:
    identify an operating state of the internal combustion engine defined by a full-load acceleration with a closed turbocharger wastegate;
    receive a signal from the pressure sensor;
    determine a cylinder air mass based at least in part on the signal from the pressure sensor;
    send a signal to the fuel injector to inject an amount of fuel into a cylinder of the internal combustion engine based on the determined cylinder air mass;
    determine and store in an associated memory a plausible intake pipe pressure gradient for the engine operating state;
    calculate a gradient of the measured intake pipe pressure;
    compare the stored plausible intake pipe pressure gradient to the calculated gradient;
    identify manipulation of the intake pipe pressure sensor if the difference between the stored plausible intake pipe pressure gradient and the calculated gradient exceeds a selected threshold value; and
    adjust a setting of the turbocharger wastegate to limit a power output of the internal combustion engine if manipulation is identified.

\* \* \* \* \*